United States Patent [19]

Hewitt et al.

[11] Patent Number: 4,715,488

[45] Date of Patent: Dec. 29, 1987

[54] COLLAPSIBLE CONVEYOR

[76] Inventors: Timothy W. Hewitt, 18 Kensington, Pleasant Ridge, Mich. 48069; William V. Hewitt, 1103 Park St., Royal Oak, Mich. 48067

[21] Appl. No.: 822,477

[22] Filed: Jan. 24, 1986

[51] Int. Cl.⁴ .......................................... B65G 13/00
[52] U.S. Cl. .............................. 193/35 R; 198/861.1; 248/413; 403/104; 403/362
[58] Field of Search ........................ 198/861.1, 860.1; 108/129, 80, 81, 35, 36, 116; 193/35 R, 35 TE; 248/439, 440, 188.6, 157, 413, 188.5; 403/109, 110, 104, 330, 362

[56] References Cited

U.S. PATENT DOCUMENTS

| Re. 24,319 | 5/1957 | McLaughlin | 193/35 R |
|---|---|---|---|
| 1,428,629 | 9/1922 | Gunn | 108/81 |
| 1,894,742 | 1/1933 | Harter | 248/413 |
| 2,199,097 | 4/1940 | Chappelle | 193/35 R |
| 2,352,837 | 7/1944 | Hillenbrand | 108/81 |
| 2,438,527 | 3/1948 | Werner | 198/861.1 |
| 2,927,757 | 3/1960 | Omohundro et al. | 248/413 |
| 3,143,086 | 8/1964 | Tumer et al. | 108/81 |
| 3,181,676 | 5/1965 | Hire | 193/35 |
| 3,455,256 | 7/1969 | Prager | 108/116 |
| 3,552,546 | 1/1971 | Rath | 198/233 |
| 3,604,734 | 9/1971 | Friedman | 403/104 |
| 3,664,488 | 5/1972 | Florian et al. | 193/139 |
| 3,951,279 | 4/1976 | Jones | 214/83.26 |
| 4,087,127 | 5/1978 | Lotta | 108/81 X |
| 4,146,126 | 3/1979 | Mattos | 198/861.1 |
| 4,160,501 | 7/1979 | Johannsen | 198/632 |
| 4,245,732 | 1/1981 | Couperus | 198/313 |
| 4,393,969 | 7/1983 | Woell | 193/35 TE |
| 4,471,969 | 9/1984 | Zabala et al. | 108/129 |
| 4,476,974 | 10/1984 | Bradbury | 198/832 |
| 4,520,981 | 6/1985 | Harrigan | 248/413 |
| 4,528,768 | 7/1985 | Anderson | 403/104 X |

FOREIGN PATENT DOCUMENTS

| 122573 | 10/1984 | European Pat. Off. | 198/861.1 |
|---|---|---|---|
| 524133 | 8/1921 | France | 193/35 R |
| 907085 | 2/1946 | France | 108/129 |
| 1100664 | 9/1955 | France | 108/129 |
| 1151069 | 1/1958 | France | 193/35 R |
| 1180108 | 6/1959 | France | 248/413 |
| 2421579 | 11/1979 | France | 108/129 |
| 0072462 | 8/1947 | Norway | 248/413 |

Primary Examiner—Robert J. Spar
Assistant Examiner—Lyle Kimms
Attorney, Agent, or Firm—Gifford, Groh, VanOphem, Sheridan, Sprinkle and Dolgorukov

[57] ABSTRACT

A collapsible conveyor comprises a frame supporting a plurality of rollers and a support structure comprising a pair of legs pivotally secured to the frame. The conveyor also includes braces which extend between the frame and the legs and maintain stability of the legs in their extended position. Each leg comprises a first member slidably receiving a second member therein. The second member includes an inclined surface which tapers towards an opposite surface downwardly towards the lower portion of the inserted leg member. A locking plate is pivotally secured to the first leg member adjacent the inclined surface, and is abutted against the upper leg member by a bolt threadably engaged within a mounting plate secured to the hollow leg member. In addition, each brace includes a pair of substantially U-shaped channel members interconnected by a pivot pin so that one of the brace members can be pivoted toward and into the longitudinal channel of the other brace member when the leg is folded up against the conveyor frame. The brace members pivot towards each other in a direction facing away from the point at which the legs are pivotally secured to the conveyor frame so that a load supported by the conveyor urges the brace toward its fully locked and extended position.

9 Claims, 5 Drawing Figures

4,715,488

COLLAPSIBLE CONVEYOR

BACKGROUND OF THE INVENTION

I. Field of the Invention

The present invention relates generally to apparatus conveying and supporting articles, and more particularly, to a portable conveyor section having collapsible supports.

II. Description of the Prior Art

Many industrial production machines are adapted to produce a wide variety of workpieces. However, each workpiece may require a different series of operations during production. As a result, workpiece routes intermediate production machines are often temporarily erected with the use of collapsible conveyor components. However, even though the conveyors are temporarily erected, the conveyor sections must be stable enough to support and transport the workpieces along the predetermined route.

Although it has been known to employ telescoping type legs so that the height of the conveyor can be adjusted as necessary, the means for locking the telescoping sections of the legs together often produce substantial wear on the leg sections, and thus over time, can affect the ability of the leg structure to maintain the conveyor at a predetermined height. Moreover, the conveyor sections may be constructed without support structures, and special supports must be constructed for each predetermined route to assure that the conveyor bed is stably supported along the entire route. Of course, such supports requires substantial floor space when not in use and substantially increase the complexity of constructing, installing and disassembling an intermittently needed conveyor section.

SUMMARY OF THE PRESENT INVENTION

The present invention overcomes the above mentioned disadvantages by providing a collapsible conveyor section having adjustable supports which are not subjected to wear as the legs are repeatedly locked and unlocked and which provides substantial stability to the conveyor section. Moreover, the conveyor section and supports fold compactly for storage in a minimum of space when not in use.

The collapsible conveyor generally comprises a frame including means for displaceably supporting articles thereon, preferably in the form of spaced rollers rotatably secured to the frame. In addition, a leg is pivotally secured to the frame near each end so that the two legs can be pivoted to lie against the bottom of the frame. The legs are stably supported in their extended position by a folding brace.

In the preferred embodiment, each leg comprises a first elongated hollow member adapted to receive an elongated second member therein. One surface of the second member is inclined toward the opposite surface as it extends downwardly, and a locking plate is pivotally secured to the first leg member adjacent to the inclined surface. The locking plate is engaged against the inclined surface by a rotatable locking member. As a result, the rotatable locking member does not engage wear against the upper leg member as it is turned to extend toward the leg member. In addition, the taper formed by the inclined surface of the upper leg member prevents slippage of the upper member with respect to the lower member.

Preferably, the brace comprises a first brace section pivotally secured at one end to a second brace member. Preferably, the first and second brace members are formed from substantially U-shaped channel members and one of the base members is dimensioned to fit within the longitudinal channel of the other member when the members are pivoted together. Moreover, the pivot joint between the first and second brace members is constructed so that the members pivot toward each other only in a direction away from the point at which the respective leg is secured to the frame so that the force of any load supported by the conveyor serves to lock the brace in a stable, operative position.

As a result, the present invention provides a collapsible conveyor section which provides extremely stable support for the conveyor frame but which folds to a very compact form for storage. Moreover, the support structure is not subjected to wear which can adversely affect the ability of the legs to support the conveyor frame under load. These and other advantages will be described in greater detail hereinafter with respect to the preferred embodiment of the present invention.

BRIEF DESCRIPTION OF THE DRAWING

The present invention will be more clearly understood with reference to the following detailed description of the preferred embodiment of the present invention when read in conjunction with the accompanying drawing in which like reference characters refer to like parts throughout the views and in which.

DETAILED DESCRIPTION OF A PREFERRED EMBODIMENT OF THE PRESENT INVENTION

Figure 1:
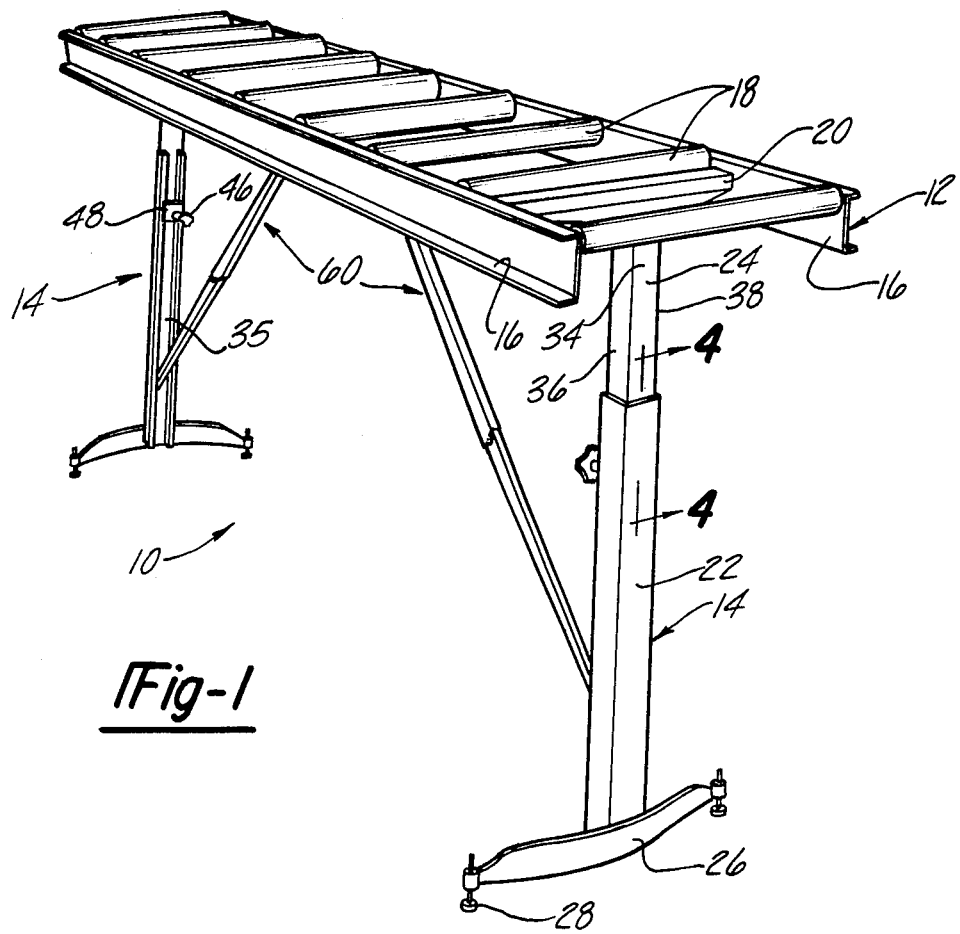
FIG. 1 is a perspective view of a collapsible conveyor according to the present invention.

Referring first to FIG. 1, a collapsible conveyor 10 according to the present invention is thereshown comprising a conveyor frame 12 supported by a pair of legs 14. The frame 12 comprises a pair of channel beams or rails 16 rotatably supporting a plurality of rollers 18 therebetween. In addition, leg support brackets 20 are pivotally entrained between the rails 16. Although the rollers 18 comprise one means for displacably supporting articles on the frame 12, it will be understood that other forms of displacably supporting structures, such as use of ball type rollers or rotatably driven rollers can be used without departing from the scope of the present invention.

Figure 2:
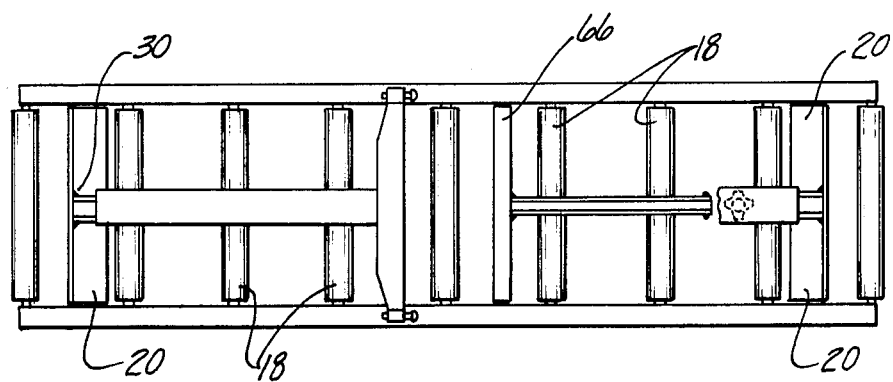
FIG. 2 is a bottom plan view of a conveyor section shown in FIG. 1 but with portions of a leg removed for the sake of clarity.

Each leg 14 includes a first elongated hollow member 22 and a second elongated member 24 adapted to be slidably received within the first member 22. The lowermost end of the hollow member 22 includes a laterally extending foot 26. Preferably, the foot 26 is substantially the same width as the width of the frame 12 so that, as shown in Fig. 2, none of the support structure extends outwardly beyond the periphery of the frame 12 when the conveyor 10 is folded. A stemmed foot pad 28 is engaged through a journal opening at each end of the foot 26. The upper end of the leg member 24 is secured by welds 30 or the like to the pivotally mounted support bracket 20.

Figure 3:
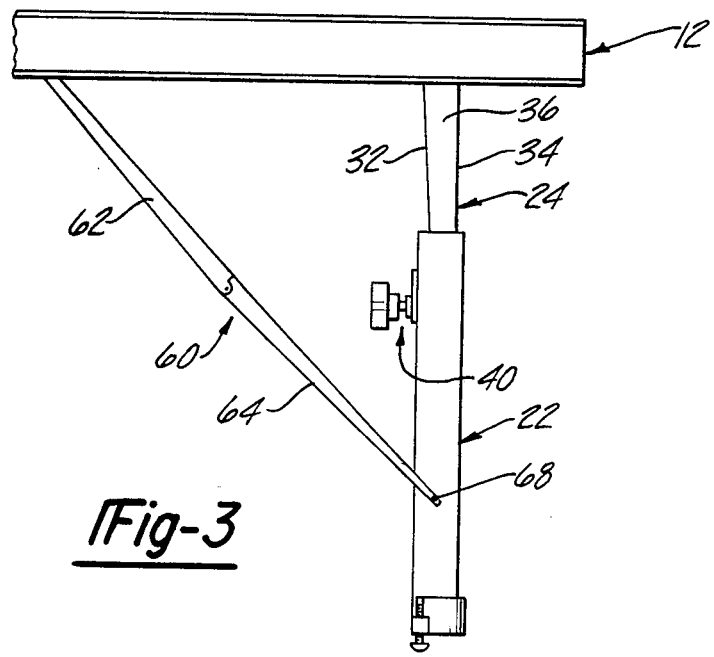
FIG. 3 is a front elevational view of a portion of the device shown in FIG. 1.
Figure 4:
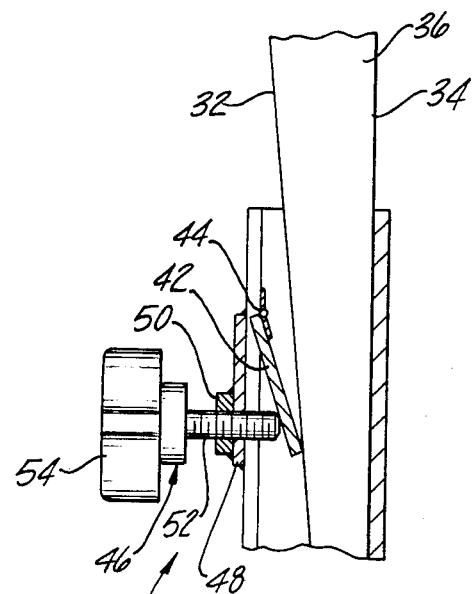
FIG. 4 is an enlarged sectional view taken substantially along the line 4—4 in FIG. 1.

Referring now to FIGS. 3 and 4 the interconnecting portions of the leg member 24 and the hollow leg member 22 have a substantially rectangular cross section. However, one surface 32 on the leg member 24 is inclined toward the opposite leg surface 34 toward the lower end of the member 24. the front and rear surfaces 36 and 38, respectively, are flat and closely engage the adjacent front and rear surfaces of the hollow leg member 22. In addition, the leg surface 34 flatly engages the adjacent wall of hollow leg member 22. As a result, it will be understood that three sides of the leg member 24 conform with sides of the hollow leg member 22 so as to provide a stable support leg 14. Moreover, the surface 34 is urged tightly against the corresponding surface of the hollow member 22 by a locking means 40.

As best shown in FIG. 4, the locking means 40 comprises a plate 42 pivotally secured on the side of the hollow leg member 22 adjacent to the inclined surface 32. The hinge 44 permits the plate 42 to pivot from a substantially vertical position toward a position extending into the chamber of the hollow leg member 22 at an angle similar to the angle at which the surface 32 is inclined with respect to the leg surface 34 of the upper leg member 24. Pivoting of the plate 42 is controlled by a rotatably locking member 46 preferably, in the form of a bolt with an enlarged head.

As best shown in FIG. 1, the side of the hollow leg member 22 lying adjacent the inclined surface 32 of the leg member 24 includes a pair of edge flanges separated by an elongated opening 35. In such a construction, a mounting plate 48 is secured across the flanges and includes a nut 50 (FIG. 4) welded thereto in registration with an opening in the plate 48.

As best shown in FIG. 4, the nut 50 threadably engages the stem 52 of the locking member 46 so that the stem 52 can extend into the hollow member 22 adjacent the plate 42. Of course, it is to be understood that other means for supporting the rotatable member, such as a threaded aperture formed in a wall of the leg member can also be used. In any event, as the englarged head 54 of the locking member 46 is rotated, the stem 52 is urged against the plate 42 which in turn becomes tightly engaged against the inclined surface 32 of leg member 24. Of course, rotation of the rotatable locking member 46 in the opposite direction permits plate 42 to retract from engagement with the surface 32 of leg member 24.

As a result, it will be understood that rotation of locking member 46 does not mar the surface 32 as it is rotated for tight engagement of the leg member 24 in the hollow leg member 22. Nevertheless, the surface 34 of the leg member 24 is tightly engaged against the corresponding surface of the hollow leg member 22 and the upper leg member 24 is prevented from sliding downwardly into the hollow leg member 22 as the increasing width of the leg member 24 prevents the leg from passing the pivoting plate 42 any further. As a result, any load upon the conveyor 10 tends to lock the leg more firmly in its predetermined position.

Figure 5:
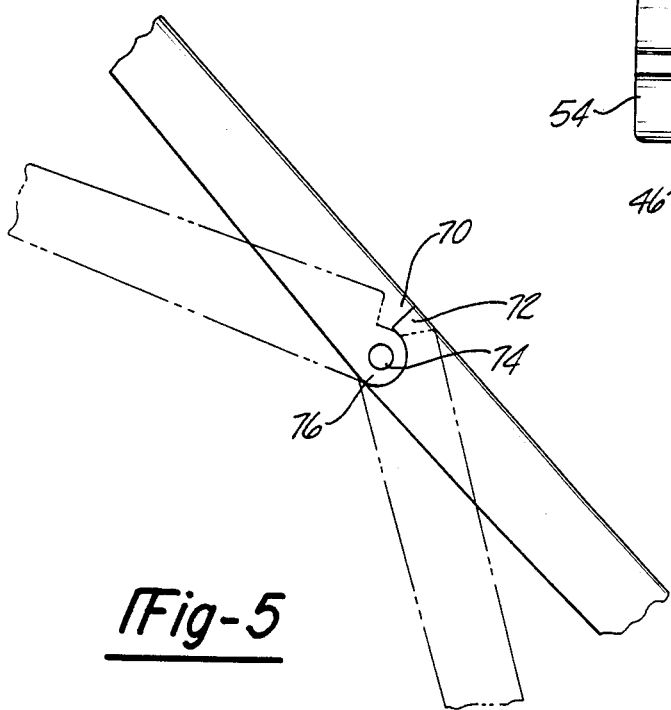
FIG. 5 is an enlarged view of a portion of the device shown in FIG. 3.

Referring now to FIG. 5, construction of the brace 60 is thereshown comprising a first brace member 62 and a second brace member 64. One end of the first brace member 62 is pivotally secured to the frame 12 by a bar 66 (FIG. 2) pivotally secured about an axle extending between the frame rails 16 in much the same manner as the pivoting bracket 20 and the rollers 18. An end of the brace member 64 extends through the opening between the edge flanges in the hollow leg member 22 and is pivotally secured to the hollow leg member 22 by a pivot pin 68 (FIG. 3). The interconnected ends 70 and 72 of the brace member 62 and 64, respectively, are connected together by a pivot pin 74.

As best shown in FIG. 5, the end 70 of brace member 62 includes longitudinally extending ears 76 having an aperture adapted to receive the pivot pin 74 therethrough. Similarly, ears on the brace member 64 having apertures in registration with the apertures in ears 76 are provided on the end portion 72 of the brace member 64. As shown in solid line in FIG. 5, the top edges of the ends 70 and 72 abut against each other when the leg members 62 and 64 are substantially at 180° with respect to each other. However, the brace member 64 is narrower than the brace member 62 so that as the brace members 62 and 64 are pivoted as shown in phantom line in FIG. 5, the brace member 64 moves toward and is received within the channel of the substantially U-shaped brace member 62. As a result, when the leg 14 is in its extended position as shown in FIGS. 1 and 3, the mating edges of the end portions 70 and 72 serve to lock the brace 60 and thus the leg 14 in its fixed position. Moreover, as the frame 12 is subjected to a load, the force of the load tends to lock the brace 60 in its extended position and preserve the structural rigidity of the conveyor support. Furthermore, as the leg is folded inwardly toward the center of the frame 12, the brace member 64 is received within the brace member 62 and the brace members are received at least in part in the elongated opening 35 of the leg member 22 so that the leg 14 can lie closely adjacent the frame 12 in a compact arrangement.

It will be understood, of course that as the longitudinal position of the leg members 22 and 24 (FIG. 3) are adjusted to vary the vertical height of the frame 12, the pivotal position of the leg members 22 and 24 with respect to the frame 12 will also vary due to the brace 60.

Thus, the present invention provides a collapsible conveyor which can be adjusted for displaceably supporting articles at any desired height, and can maintain that height despite loading of the conveyor. Moreover, the locking means of the present invention avoids the wear which normally occurs when a threaded member is tightly engaged against a leg member of some previously known conveyor structures. Moreover, the pivoting plate 42 engaged against the inclined surface 32 of the upper leg portion increases the surface area with which the upper leg portion can be locked against the lower leg portion and the tapering shape of the upper legs serves to prevent lowering of the leg when the conveyor supports the load.

Having thus described the present invention, many modifications thereto will become apparent to those skilled in the art to which it pertains without departing from the scope and spirit of the present invention as defined in the appended claims;

What is claimed is:

1. A collapsible conveyor for article handling comprising:
    an elongated frame;
    means secured to said frame for displaceably supporting articles;
    a pair of substantially identical legs;
    means for pivotally securing said legs to opposite ends of said frame so that said legs are pivotable between a first position in which said legs lie substantially parallel to and adjacent to said frame and a second position in which the legs extend substantially perpendicular away from said frame, wherein each leg comprises an elongated first leg member and an elongated second leg member, said first leg member being hollow and having a rectangular cross sectional shape, said second leg member being telescopically slidably received in one end of said first leg member, said second leg member having three sides which flatly abut against three internal sides of the first leg member and a fourth side which longitudinally tapers along said second leg member so that a space is formed between the fourth side of said second leg member and the fourth side of said first leg member, said space decreasing in size as the insertion of the second leg member into the first leg member increases, and means for locking said leg members together at an adjusted position comprising a plate, means for freely pivotally securing said plate to said first leg member about an axis transverse to the axis of said first leg member and so that said plate depends from said plate pivotal securing means, and means for adjustably locking the pivotal position of said plate so that an edge of said plate abuts against said fourth side of said second leg member and prevents the further insertion of said second leg member into said first leg member.

2. The invention as defined in claim 1 wherein said means for adjustably locking comprises a bolt threadably engaged in said first leg member adjacent said plate.

3. The invention as defined in claim 1 and further comprising a brace for each leg, means for pivotally securing one end of said brace to said frame at a position spaced longitudinally apart from said means for pivotally securing the respective leg, means for pivotally securing the other end of said brace to said respective leg and wherein said brace includes a first brace member, a second brace member and means for pivotally securing said first brace member to said second brace member.

4. the invention as defined in claim 3 wherein said first brace member includes a longitudinal channel adapted to receive said second brace member.

5. The invention as defined in claim 3 wherein said means for pivotally securing said first and second brace members comprises means for limiting the maximum included angle between said first and second brace members to substantially 180°.

6. The invention as defined in claim 3 wherein said means for pivotally securing said first and second brace members comprises means for pivoting said first brace member toward said second brace member in a direction facing away from said means for pivotally securing said leg to said frame.

7. The invention as defined in claim 3 wherein said means for pivotally securing the other end of said brace to said respective leg comprises means for pivotally securing said other end to said first leg member.

8. The invention as defined in claim 1 wherein each said leg includes a laterally extending foot at its free end having substantially the same width as said frame.

9. The invention as defined in claim 1 wherein said means for supporting articles comprises a plurality of rollers and means for rotatably supporting said rollers laterally across said frame in longitudinally spaced apart positions.

* * * * *